United States Patent
Sheffield et al.

(10) Patent No.: US 10,701,561 B1
(45) Date of Patent: Jun. 30, 2020

(54) SYSTEM AND TECHNIQUES FOR SECRET KEY TRANSFER IN BENEFIT DENIAL SYSTEM

(71) Applicant: Lowe's Companies, Inc., Mooresville, NC (US)

(72) Inventors: Mason E. Sheffield, Woodinville, WA (US); Jonothon Frederick Douglas, Kirkland, WA (US); Paul Michael Sisneros, Kirkland, WA (US)

(73) Assignee: LOWE'S COMPANIES, INC., Mooresville, NC (US)

( * ) Notice: Subject to any disclaimer, the term of this patent is extended or adjusted under 35 U.S.C. 154(b) by 0 days.

(21) Appl. No.: 16/779,225

(22) Filed: Jan. 31, 2020

(51) Int. Cl.
*H04W 12/06* (2009.01)

(52) U.S. Cl.
CPC .................... *H04W 12/06* (2013.01)

(58) Field of Classification Search
CPC ..................................................... H04W 12/06
See application file for complete search history.

(56) References Cited

U.S. PATENT DOCUMENTS

| | | | |
|---|---|---|---|
| 5,594,228 A | 1/1997 | Swartz et al. | |
| 6,255,958 B1 | 7/2001 | Haimovich et al. | |
| 6,598,790 B1 | 7/2003 | Horst | |
| 6,607,125 B1 | 8/2003 | Clouser et al. | |
| 7,391,326 B2 | 6/2008 | Puzio et al. | |
| 7,530,489 B2 | 5/2009 | Stockton | |
| 7,564,360 B2 | 7/2009 | Cote et al. | |
| 7,619,528 B2 | 11/2009 | Kobres | |
| 8,941,498 B2 | 1/2015 | Berg | |
| 9,117,355 B2 | 8/2015 | Mohiuddin et al. | |
| 9,189,663 B2 | 11/2015 | Goren et al. | |
| 9,193,330 B2 | 11/2015 | Abshire | |
| 9,228,378 B1 | 1/2016 | Sarabi et al. | |
| 9,298,954 B1 | 3/2016 | Ewing | |
| 9,460,597 B1 | 10/2016 | Clark et al. | |
| 9,700,997 B2 | 7/2017 | Schlegel et al. | |
| 9,779,603 B1 * | 10/2017 | Subramanian | ........ H04L 63/102 |
| 9,852,596 B2 | 12/2017 | Alexis | |

(Continued)

FOREIGN PATENT DOCUMENTS

| | | |
|---|---|---|
| EP | 1125264 | 2/2004 |
| WO | 2015121833 | 8/2015 |

OTHER PUBLICATIONS

"Bosch Toolbox App", Robert Bosch GmbH, Available online at: bosch-professional.com, Feb. 18, 2018, 6 pages.

(Continued)

*Primary Examiner* — Darren B Schwartz
(74) *Attorney, Agent, or Firm* — Kilpatrick Townsend & Stockton LLP

(57) ABSTRACT

Techniques described herein are directed to a system and methods for issuing commands to an electronic device as well as techniques for transferring a device key to a user device associated with a user who has gained authorization to issue commands to the electronic device. In some embodiments, a device key may be conveyed directly from an access device to a user device. In some embodiments, the device key may be conveyed to a user device by a mobile application server which is in communication with the user device upon receiving an indication that an operator of the user device is authorized to issue commands to the electronic device.

19 Claims, 8 Drawing Sheets

(56) References Cited

U.S. PATENT DOCUMENTS

| | | | |
|---|---|---|---|
| 9,888,337 B1* | 2/2018 | Zalewski | H04W 4/70 |
| 10,186,128 B2 | 1/2019 | Gao et al. | |
| 10,332,117 B2* | 6/2019 | Krause | G06Q 20/4016 |
| 10,354,507 B1 | 7/2019 | Lercari | |
| 10,438,470 B2 | 10/2019 | Wulff | |
| 2002/0050928 A1* | 5/2002 | Olsen | G08B 13/2431 |
| | | | 340/568.1 |
| 2002/0059148 A1* | 5/2002 | Rosenhaft | G06Q 10/087 |
| | | | 705/77 |
| 2004/0145477 A1 | 7/2004 | Easter et al. | |
| 2004/0230488 A1* | 11/2004 | Beenau | G06Q 20/3278 |
| | | | 705/18 |
| 2004/0238621 A1* | 12/2004 | Beenau | G06Q 20/28 |
| | | | 235/380 |
| 2005/0200485 A1 | 9/2005 | Connolly et al. | |
| 2005/0289359 A1* | 12/2005 | Mori | G06F 21/88 |
| | | | 713/193 |
| 2007/0199988 A1* | 8/2007 | Labgold | G06Q 30/06 |
| | | | 235/385 |
| 2007/0200664 A1* | 8/2007 | Proska | G07B 15/02 |
| | | | 340/5.42 |
| 2007/0296589 A1 | 12/2007 | Cullum | |
| 2009/0043681 A1* | 2/2009 | Shoji | G06F 21/335 |
| | | | 705/35 |
| 2009/0201125 A1* | 8/2009 | Ikeguchi | G06F 21/31 |
| | | | 340/5.2 |
| 2011/0137797 A1* | 6/2011 | Stals | G06Q 20/02 |
| | | | 705/44 |
| 2011/0254687 A1* | 10/2011 | Arponen | H04M 1/72525 |
| | | | 340/540 |
| 2012/0111589 A1 | 5/2012 | Schmidt et al. | |
| 2012/0124388 A1* | 5/2012 | Chng | G06F 21/88 |
| | | | 713/189 |
| 2012/0150742 A1* | 6/2012 | Poon | G06Q 20/20 |
| | | | 705/44 |
| 2012/0271712 A1* | 10/2012 | Katzin | G06Q 20/0453 |
| | | | 705/14.51 |
| 2012/0331292 A1* | 12/2012 | Haggerty | H04L 63/0272 |
| | | | 713/168 |
| 2013/0066918 A1* | 3/2013 | Nejat | G06F 16/93 |
| | | | 707/783 |
| 2014/0019241 A1* | 1/2014 | Treiser | G06Q 30/0609 |
| | | | 705/14.53 |
| 2014/0176305 A1 | 6/2014 | Aljadeff | |
| 2014/0207660 A1 | 7/2014 | Brink et al. | |
| 2014/0372743 A1* | 12/2014 | Rogers | G06F 21/575 |
| | | | 713/2 |
| 2014/0373184 A1* | 12/2014 | Mahaffey | H04W 12/1206 |
| | | | 726/35 |
| 2015/0022358 A1 | 1/2015 | Huang | |
| 2016/0021116 A1* | 1/2016 | Maguire | H04L 63/102 |
| | | | 726/4 |
| 2016/0042341 A1* | 2/2016 | Griffin | G06F 21/41 |
| | | | 705/44 |
| 2016/0142402 A1* | 5/2016 | Kim | H04L 63/08 |
| | | | 726/4 |
| 2016/0344740 A1* | 11/2016 | Choi | H04L 63/102 |
| 2017/0076520 A1* | 3/2017 | Ho | G07C 9/253 |
| 2017/0186294 A1 | 6/2017 | Gotanda et al. | |
| 2017/0286708 A1* | 10/2017 | Erhart | G06F 21/6218 |
| 2018/0150832 A1* | 5/2018 | Badal-Badalian | G06Q 20/322 |
| 2018/0165480 A1 | 6/2018 | Raju | |
| 2018/0338241 A1* | 11/2018 | Li | H04L 67/12 |
| 2019/0114488 A1* | 4/2019 | Glazer | G08B 13/196 |
| 2019/0215394 A1* | 7/2019 | Torvinen | H04W 76/27 |
| 2019/0244451 A1* | 8/2019 | Favier | G07C 9/28 |
| 2019/0333304 A1* | 10/2019 | Flynn | G07C 9/00896 |

OTHER PUBLICATIONS

"DeWalt Tool Connect", Available online at: dewalt.com, Nov. 25, 2016, 6 pages.

"Hilti: Internet of Things Services", Available online at: hilti.com, Sep. 18, 2018, 3 pages.

"Milwaukee One-Key", Available online at: onekey.milwaukeetool.com, 2020, 7 pages.

* cited by examiner

SYSTEM AND TECHNIQUES FOR SECRET KEY TRANSFER IN BENEFIT DENIAL SYSTEM

CROSS-REFERENCES TO RELATED APPLICATIONS

This application is related to U.S. Non-Provisional application Ser. No. 16/779,335, filed Jan. 31, 2020 as well as U.S. Non-Provisional application Ser. No. 16/779,431, filed Jan. 31, 2020, which are each herein incorporated by reference in their entirety for all purposes.

BACKGROUND

One of the greatest costs to participants in the retail industry is shrinkage. Shrinkage refers to any reduction in inventory which is available for sale and is typically caused by theft (e.g., either shoplifting or employee theft), waste (e.g., breakage), supplier fraud, or errors (e.g., accounting errors). The average loss to shrinkage for a participant in the retail industry is about 2% of sales. According to the National Retail Security Survey on retail theft, losses due to shrinkage cost retailers more than $49 billion in 2016.

While security measures such as cameras and digitized tags that set off alarms have helped reduce losses due to shrinkage, retailers still struggle to further reduce losses. Some retailers have opted to reduce losses due to shrinkage by locking up high-dollar items, which are typically the targets of theft, so that the items need to be retrieved by a retail employee before they can be purchased by a consumer. However, this solution creates a significant strain on retail employees who may be too busy to retrieve the item. Additionally, this solution may cause consumers to become frustrated and leave without completing an intended purchase if they are unable to find an employee that can retrieve an item. Locking up of products tends to inhibit sales, and thereby tends to negatively impact revenue.

Embodiments of the invention address these and other problems, individually and collectively.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Techniques described herein are directed to a system and methods for issuing commands (e.g., lock/unlock commands) to an electronic device as well as techniques for transferring a device key to a user device associated with a user who has gained authorization to issue commands to the electronic device (e.g., by making a purchase of the electronic device). In some embodiments, a device key may be conveyed directly from an access device (e.g., a point-of-sale (POS) device) to a user device. In some embodiments, the device key may be conveyed to a user device by a mobile application server which is in communication with the user device upon receiving an indication that an operator of the user device is authorized to issue commands to (e.g., lock or unlock) the electronic device.

In accordance with embodiments of the system described herein, each electronic device that enters the inventory of a resource provider (e.g., a retailer or other merchant) may have included within it a circuit capable of restricting power to one or more components of the electronic device. At an intake stage, the resource provider may initialize each electronic device by providing a unique device key (e.g., a device key associated with only that electronic device), which is recorded by the resource provider. The electronic device is then placed into a locked state, which prevents the electronic device from being used. The only means of removing the electronic device from the locked state is to establish a communication session with the electronic device (e.g., via a separate user device) and issue an unlock command. However, this command will only be executed by the electronic device if accompanied by the device key. In the described system, mappings are maintained between each electronic device (e.g., via a device identifier) and its corresponding device key. Upon receiving an indication that an electronic device has been purchased, a record of purchase is recorded and the device key is conveyed to a user device. In some cases, the device key is conveyed to a user device operated by an agent of the resource provider, which then unlocks the electronic device before it leaves the store. In some cases, the device key is conveyed to a user device operated by a purchaser of the electronic device, which is then able to issue commands to the electronic device (e.g., lock/unlock command).

One embodiment of the disclosure is directed to a method performed by a mobile application server comprising receiving an indication of an update to an authorization status of an electronic device, the indication including at least an identifier for the electronic device, identifying a device key associated with the electronic device, the device key being associated with only the electronic device, determining a user device associated with the update to the authorization status of the electronic device, and transmitting the device key to the user device, the device key being usable by the user device to issue commands to the electronic device.

Another embodiment of the disclosure is directed to a mobile application server comprising a processor and a memory including instructions that, when executed with the processor, cause the mobile application server to, at least: receive an indication of an update to an authorization status of an electronic device, identify a device key associated with the electronic device, determine a user device associated with the update to the authorization status of the electronic device, and transmit the device key to the user device, the device key being usable by the user device to issue commands to the electronic device.

Yet another embodiment of the disclosure is directed to a user device comprising: a processor; and a memory including instructions that, when executed with the processor, cause the user device to, at least receive an indication of an electronic device identifier, receive a device key associated with the electronic device identifier and store the device key in the memory in association with the electronic device identifier, and establish a communication session with an electronic device associated with the electronic device identifier, and issue a command to the electronic device via the communication session, the command including at least the device key.

For a fuller understanding of the nature and advantages of the present invention, reference should be made to the ensuing detailed description and accompanying drawings.

BRIEF DESCRIPTION OF THE DRAWINGS

Various embodiments in accordance with the present disclosure will be described with reference to the drawings, in which.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
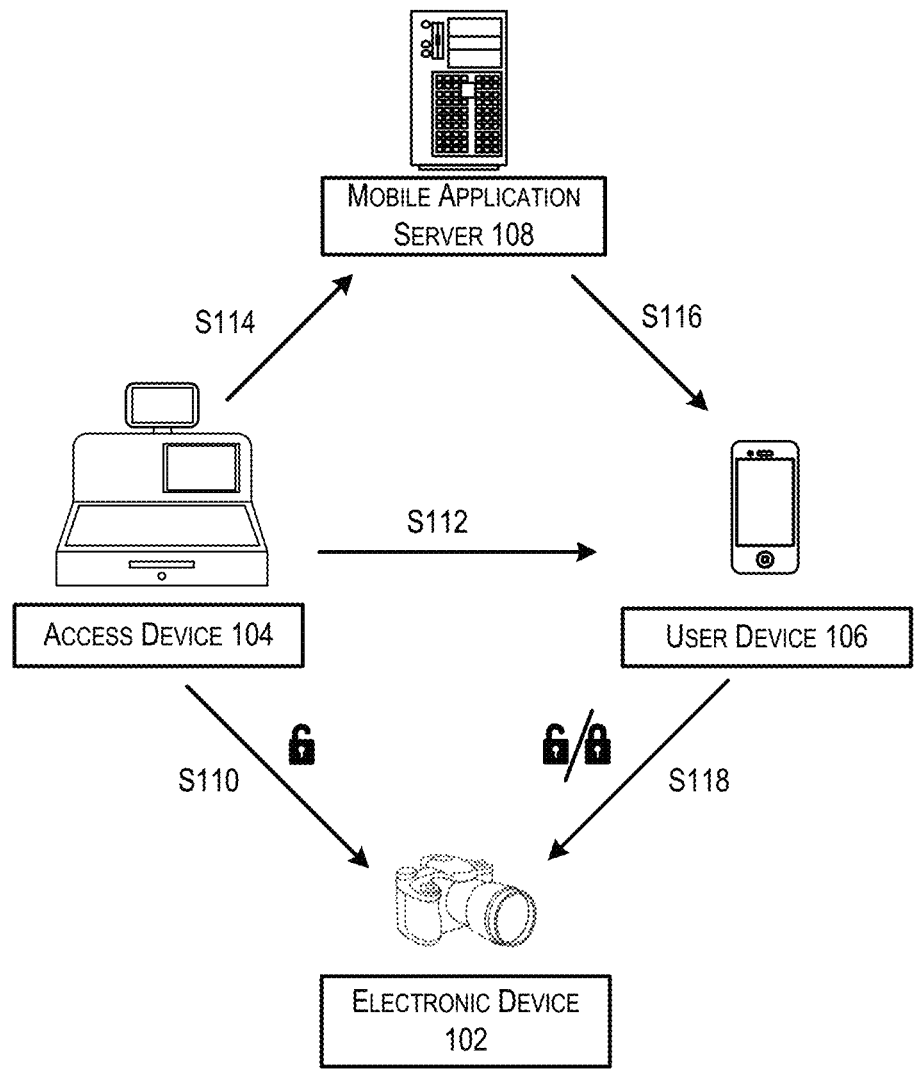
FIG. 1 depicts an illustrative overview of an example system in which an unlock in accordance with at least some embodiments.

FIG. 1 depicts an illustrative overview of an example system in which an unlock operation can be accomplished in accordance with at least some embodiments. In FIG. 1, an electronic device 102 may be capable of establishing communication (either via wireless connection or via physical connection) with an access device 104 as well as a user device 106. The access device 104 and/or the user device 106 further may be capable of establishing communication with a mobile application server 108.

The electronic device 102 may be any suitable device that accomplishes its purpose electronically. The electronic device 102 may have installed within it an electronic circuit which enables it to be locked and/or unlocked. In some embodiments, the electronic circuit may be installed between a power source and other components of the electronic device 102 configured to perform some function, such that the electronic circuit is able to restrict or disrupt power to those components. At least a portion of the electronic circuit may include a secure element which includes encrypted data that cannot readily be accessed outside of the secure element. One or more device keys may be stored within this secure element of the electronic circuit. As described herein, the electronic device may be a special purpose device having a primary function such as a device designed to accomplish a particular task. A special purpose device may include a system or device designed for restricted use in particular problem areas. The special purpose device may also be a computing device with specific programming which causes it to perform at least one specific task, thereby being a special purpose device. Examples of special purpose devices include power tools (e.g., corded or cordless screw drivers, routers, screw guns, drills, saws, staplers, compressors, impact wrenches and drivers, grinders, adhesive dispensers, etc.), battery chargers, drones, cameras, outdoor power equipment (e.g., corded or cordless hedge trimmers, string trimmers, edgers, leaf blowers, lawn mowers, generators, chain saws, etc.). These examples, among others, perform operations or tasks beyond merely calculating and processing information, and as such, accomplish substantially more than what can be accomplished using a mere general purpose computer.

An electronic device 102 may be configured to perform multiple functions. In some embodiments, the electronic circuit may be configured to restrict or disrupt certain functions of the multiple functions performable by the electronic device 102, either individually or as a group. Some illustrative examples of an electronic device having an electronic circuit as described herein are described in greater detail with respect to U.S. patent application Ser. No. 16/779,335, entitled "BENEFIT DENIAL SYSTEM FOR SELECTIVELY PREVENTING OPERATION OF POWER TOOLS" which is herein incorporated by reference in its entirety for all purposes. In some embodiments, the electronic circuit may operate using a power source (hereinafter "independent power source") which is separate and/or distinct from the power source of the electronic device 102 itself, enabling an operation to be performed using the electronic circuit even if the electronic device 102 is unpowered (e.g., disconnected from its power source). If, for example, the electronic device 102 is a cordless drill with a removable and replaceable rechargeable battery adapted to power a drilling function, a power source (e.g., compact battery, such as a watch battery) separate and/distinct from the rechargeable battery can be included with the drill and used to power the electronic circuit while the rechargeable battery is removed from the drill. In some cases, the independent power source may be recharged by drawing power from the power source of the electronic device 102. In some embodiments, the electronic circuit may include an inductive coil which enables it to be powered remotely in order to perform an operation.

The access device 104 may be any suitable device capable of managing access to an electronic device 102. In some embodiments, the access device 104 may be a point-of-sale (POS) terminal operated by, or on behalf of, a resource provider (e.g., a merchant) in order to provide access to goods and/or services. In some embodiments, the access device 104 may include a communication interface configured to interact with other devices (e.g., electronic device 102, user device 106, and/or mobile application server 108). In some embodiments, the access device 104 may include specialized equipment capable of interacting with the electronic device 102. For example, the access device may include an inductive coil capable of remotely powering the electronic device 102 in order to allow the electronic device 102 (e.g., the electronic circuit of the electronic device 102) to perform an operation even if the power supply that ordinarily powers the electronic device 102 during operation is not electrically connected to the electronic device 102.

The user device 106 may be any electronic device capable of establishing a communication session with another device and transmitting/receiving data from that device. A user device 106 may include the ability to download and/or execute mobile applications. User devices may include mobile communication devices as well as personal computers and thin-user devices. By way of illustrative example, a user device may be a smart phone, a personal data assistant (PDA), or any other suitable handheld device.

In some embodiments, the user device 106 may include a communication interface configured to enable communication between the user device and another electronic device (e.g., mobile application server 108, access device 104, electronic device 102, and/or a wireless router that manages access to a network). Examples of a suitable communication interface may include radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. A second example of a suitable communication interface may include an optical input device capable of obtaining graphical input, such as a camera device or a barcode reader. In this second example, the user device 106 may be presented with a machine-readable code, which may be scanned using the optical input device in order to obtain data encoded into the machine-readable code. In some embodiments, the communication interface may include both long range and short range communication means. For example, the communication interface may include an antenna configured to connect to a cellular network in order to enable communication with various other components of the depicted architecture.

The mobile application server 108 may be any computing device configured to provide remote support for a user device 106. The mobile application server 108 may be associated with a set of computer executable instructions to be installed on, and executed from, the user device 106 (e.g., a mobile application). The mobile application server 108 may provide any suitable service and/or processing for the user device. For example, the mobile application server 108 may perform calculations on behalf of the user device. In some embodiments, the mobile application server may maintain an account for one or more users. The mobile application server 108 may also store any protocols and/or user preferences related to the operation of the user device.

The mobile application server 108 may be made up of any computer or cluster of computers. For example, the mobile application server 108 can be a large mainframe, a mini-computer cluster, or a group of servers functioning as a unit. In one example, the mobile application server 108 may be a database server coupled to a Web server. The mobile application server 108 may be coupled to a database and may include any hardware, software, other logic, or combination of the preceding for servicing the requests from one or more client computers (e.g., access device 104 and/or user device 106). The mobile application server 108 may comprise one or more computational apparatuses and may use any of a variety of computing structures, arrangements, and compilations for servicing the requests from one or more client computers.

In some embodiments, at least a portion of the functionality performed by a mobile application installed upon, and executed from, the user device 106 may be performed by a mobile application server 108 in communication with the mobile application. For example, upon execution of a mobile application, the user device 106 may establish a communication session with the mobile application server 108 in which at least some processing is performed by the mobile application server 108 on behalf of the mobile application. In some embodiments, the mobile application server 108 may maintain an account associated with the user device and/or its user. The account maintained by the mobile application server 108 may store a number of data elements related to the user. For example, the application server may store user data, information on item (e.g., electronic device) ownership, or any other suitable data. Additionally, the mobile application server 108 may maintain a mapping of device keys to electronic devices. The application server may, upon receiving an indication of a purchase of the electronic device 102 by a user, automatically (e.g., without human interaction) identify the device key associated with the electronic device 102 and associate that device key to an account for the user. The mobile application server may also automatically identify the user device 106 as being associated with the user (via the stored user data) and may transmit the device key to the user device 106 (e.g., via a push notification). In some embodiments, the device key, once received by the user device 106, may be used to interact with the electronic device 102 (e.g., to issue lock and/or unlock commands) over a communication channel (e.g., Bluetooth™). In some embodiments, the device key may be usable only by a mobile application installed upon the user device 106.

A device key may be any suitable string of characters capable of being used to authorize an operation (e.g., a lock or unlock operation) with respect to the electronic device 102. A device key may be unique to a particular electronic device. In other words, each electronic device may be associated with a different device key. In some embodiments, a device key may be a random or pseudo-random string of characters, such that the device key cannot be readily derived from information related to the electronic device. In some embodiments, a device key may be derivable from an identifier for the electronic device. In these embodiments, a device key may be independently generated by any entity that has the prerequisite information (e.g., an entity in possession of the electronic device) and access to an algorithm (which may be secret) for generating such a device key. For example, in some embodiments, a device key may be derived for a particular electronic device by applying a hash function to an identifier for that electronic device. In this example, the identifier for the electronic device may correspond to a Universal Product Code (UPC) and serial number or other identifier. Some electronic devices may include an indication of their respective identifiers (e.g., within a barcode or other machine-readable code associated with the electronic device).

In some embodiments, a device key stored in an electronic device 102 may be altered or changed. For example, a purchaser of an electronic device 102 may, upon completing a purchase for the electronic device and receiving the device key, replace or overwrite the existing device key with a new device key. The replacement device key may be of his or her choosing or it may be random. Note that an operation to replace or overwrite an existing device key may require that the current device key be provided. In some embodiments, an electronic device 102 may include multiple device keys, each of which may be specific to the electronic device 102. For example, a single electronic device 102 may include two separate device keys, where a first device key may be provided to a purchaser of the electronic device 102 (and which may be replaced) and a second device key which may be stored by the resource provider and/or mobile application server 108 without being provided to the purchaser (i.e., a master key).

In some embodiments, the electronic device 102 may initially be in an unlocked state when no device key has been assigned to it. The electronic device may be configured to become locked upon receiving and storing an initial device key. In an exemplary system in which electronic devices are sold by a resource provider, the resource provider, upon receiving the electronic device 102 into inventory from a manufacturer, may select a device key to be associated with that electronic device. The resource provider may then provision the device key onto the electronic device 102 which may subsequently initiate a lock operation using the device key. The device key may then be provided to the mobile application server 108, where it may be stored in association with an identifier for the electronic device 102. In such a system, any electronic device 102 placed on a shelf or offered for sale by the resource provider may be in a locked state when it is exposed to potential purchasers. In this way, the electronic device may be made inoperable until an unlock operation is performed using the correct device key. Such a system derives potential thieves of any benefit that may be gained from the theft of the electronic device 102.

By way of illustrating interactions between various components of the system described herein, consider the following scenario. A user may enter a retail establishment in which at least one embodiment of the described system is implemented. In this scenario, the user may select the electronic device 102 for purchase and may bring the electronic device to a POS terminal (e.g., the access device 104) to complete the purchase. Upon receiving payment and completing the transaction (e.g., at the POS terminal), the device key may be used to unlock the electronic device 102.

In one potential scenario, the access device 104 may provide the device key to the electronic device 102 directly at step S110. The access device 104 may have access to the device key associated with the electronic device 102 directly or it may need to perform a lookup operation. In some embodiments, this may involve transmitting a request to the mobile application server 108 in order to obtain the device key. In some embodiments, the access device 104 may include a short-range wireless communication means capable of conveying the device key and an unlock command to the electronic device 102. In some embodiments, the access device 104 may include an inductive coil which can temporarily and remotely (e.g., in a contact-less and/or wireless manner) power the electronic device 102 (e.g., the aforementioned electronic circuit thereof) so that the device key and unlock command can be provided to the electronic device 102 even if the power supply (e.g., a rechargeable battery) that normally powers operation of the electronic device 102 during use is not electrically connected to the electronic device 102. It should be noted that in some embodiments, step S110 may be performed even if other means are used to provide the device key to a user as described below.

In another potential scenario, the access device 104 may provide the device key to a user device 106 directly at step S112. In some embodiments, the device key may be transmitted directly to the user device 106 via a wireless transmission. In some embodiments, the device key may be encoded into a machine-readable code (e.g., a barcode or quick response (QR) code) which is printed onto a receipt produced by the access device 104. In this scenario, the user device 106 may obtain the device key upon scanning the machine-readable code using a camera or barcode reader. In some embodiments, the user device 106 may subsequently provide the device key (and an identifier for the electronic device 102) to the mobile application server 108 (e.g., via a mobile application executed from the user device 106) which may associate it with an account maintained for the user.

In yet another potential scenario, access device 104 may provide the device key to a mobile application server 108 at step S114, which may then provide the device key to the user device 106 at step S116. In some embodiments, the user may be prompted for a user identifier that may be used to identify and/or contact the user. In some embodiments, the user may present a loyalty identifier that may be used to identify a user account maintained by the mobile application server 108. Upon identifying an account associated with the user, the mobile application server 108 may associate an identifier for the electronic device 102 and its corresponding device key to the identified account. Additionally, the mobile application server 108 may identify one or more user devices 106 associated with the identified account and may push the device key to those user devices 106.

In some embodiments, the user may provide an email address, phone number, or other contact information that may be used to initiate contact with the user with the device key. For example, upon the user providing an email address, the user may be sent an email message by the mobile application server 108 that includes the device key or a link that may be used to gain access to the device key. In another example, upon the user providing a phone number, the user may be sent a short messaging service (SMS) message that includes the device key, which may be received on the user device 106.

Once the user device 106 has received the device key associated with the electronic device 102, an operation may be performed at step S118. To do this, a communication session may first be established between the user device 106 and the electronic device 102 (e.g., via a short-range wireless communication channel). Once established, the communication session may be used to convey a command from the user device 106 to the electronic device 102 along with the device key. In some embodiments, the device key may be encrypted or otherwise obscured during its transmission. Upon receiving the device key, the electronic device 102 may be further configured to compare the received device key to the device key stored in memory. If the device keys match, then the electronic device 102 may execute the received command. If the device keys do not match, then the electronic device 102 may fail to execute the received command. In some embodiments, the electronic device 102 may also return an error indication to the user device 106 via the communication channel if the received device key does not match the one stored in memory of the electronic device 102. In some embodiments, the user device 106 may be operated by a consumer or purchaser of the electronic device 102. In some embodiments, the user device 106 may be operated by an agent or employee of the resource provider, such that the agent is then able to unlock the electronic device 102 before it leaves a retail establishment.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

Figure 2:
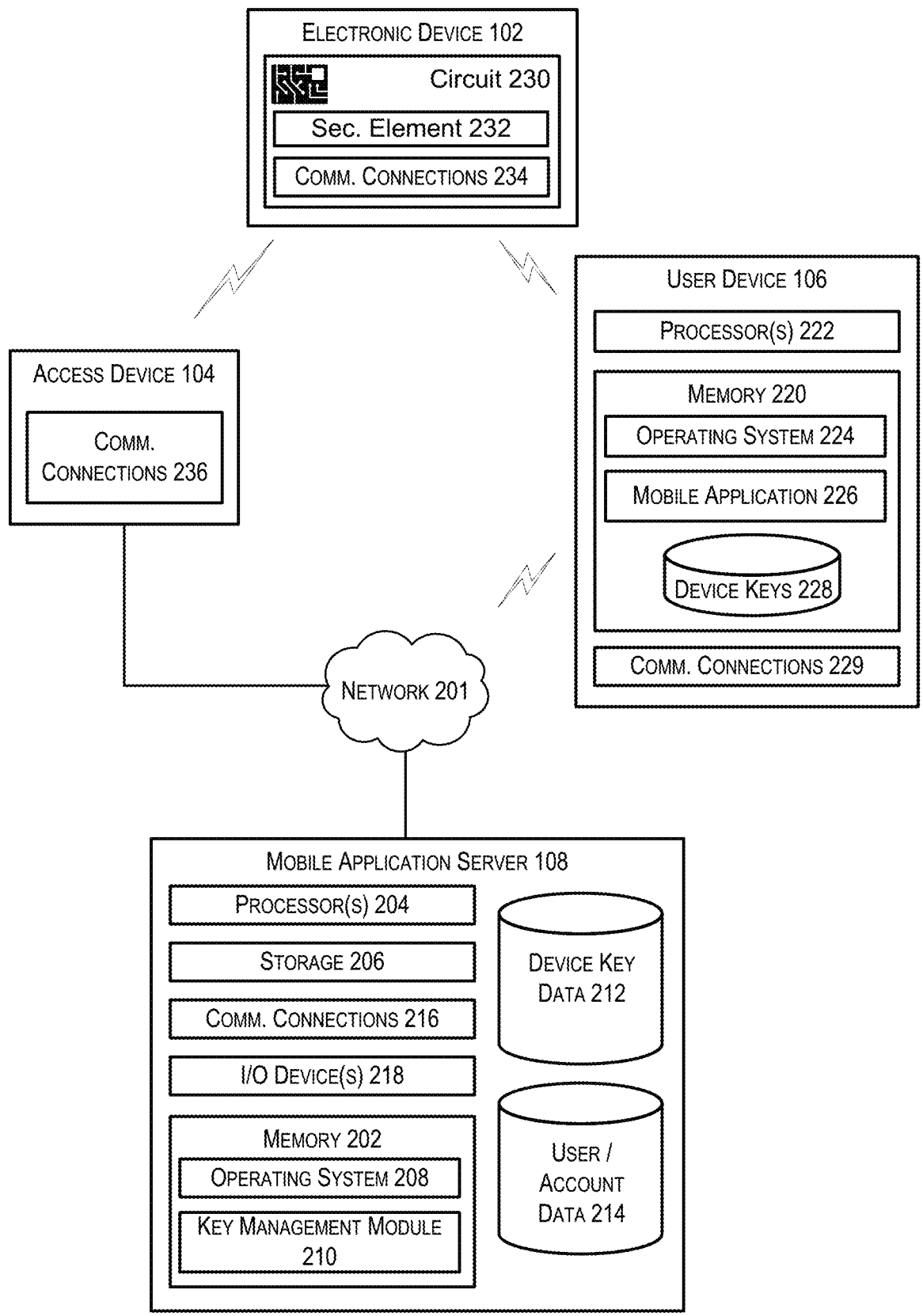
FIG. 2 depicts an example system architecture for a system that may be implemented to perform the functionality described in accordance with at least some embodiments.

FIG. 2 depicts an example system architecture for a system that may be implemented to perform the functionality described in accordance with at least some embodiments. As depicted in FIG. 2, an exemplary architecture may include an electronic device 102, an access device 104, a user device 106, and a mobile application server 108 as described with respect to FIG. 1 above. One or more of these components may communicate either directly or over a network 201.

The mobile application server 108 may be any type of computing device configured to perform at least a portion of the functionality described herein. In some embodiments, the mobile application server 108 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the mobile application server 108 may include at least one memory 202 and one or more processing units (or processor(s)) 204. The processor(s) 204 may be implemented as appropriate in hardware, computer-executable instructions, firmware or combinations thereof. Computer-executable instruction or firmware implementations of the processor(s) 204 may include computer-executable or machine executable instructions written in any suitable programming language to perform the various functions described. The mobile application server 108 may also include additional storage 206.

The memory 202 may store program instructions that are loadable and executable on the processor(s) 204, as well as data generated during the execution of these programs. Depending on the configuration and type of mobile application server 108, the memory 202 may be volatile (such as random access memory (RAM)) and/or non-volatile (such as read-only memory (ROM), flash memory, etc.). The mobile application server 108 may also include additional storage 214, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 202 may include multiple different types of memory, such as static random access memory (SRAM), dynamic random access memory (DRAM) or ROM. Turning to the contents of the memory 202 in more detail, the memory 202 may include an operating system 208 and one or more application programs or services for implementing the features disclosed herein including at least a module for maintaining mappings between device keys and accounts and distributing device keys to appropriate user devices (key management module 210). The memory 202 may also include device key data 212, which provides mappings of device keys to particular electronic devices, as well as user account data 214, which provides information related to users and user accounts (e.g., demographic data as well as user devices, associated electronic devices, etc.). In some embodiments, the device key data 212 and/or user account data 214 may be stored in a database.

The memory 202 and the additional storage 206, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are installed on and/or executed from the mobile application server 108. The mobile application server 108 may also contain communications connection(s) 216 that allow the mobile application server 108 to communicate with a stored database, another computing device or server, user terminals, and/or other components of the described system. The mobile application server 108 may also include input/output (I/O) device(s) and/or ports 218, such as for enabling connection with a keyboard, a mouse, a pen, a voice input device, a touch input device, a display, speakers, a printer, etc.

In some embodiments, the key management module 210 may be configured to, in conjunction with the processors 204, provide device keys to user devices which are determined to be associated with an electronic device. In some embodiments, the mobile application server 108 may receive an indication that a particular electronic device 102 is now associated with a particular user account (e.g., a purchase or registration notification). Upon receiving this indication, the key management module 210 may create an association between the electronic device and the account. The key management module 210 may also identify, from the user/account data 214, one or more user device 106 which is associated with the indicated user account. The key management module 210 may also identify, from the device key data 212, a device key associated with the indicated electronic device 102. The key management module 210 may then transmit the identified device key to the identified one or more user devices 106. In some embodiments, this may be done via a push notification.

In some embodiments, the user device 106 may comprise any portable electronic device capable of performing the functions disclosed herein as being attributed to the user device 106. The user device 106 may include a memory 220 (e.g., a computer-readable storage medium) storing instructions that, when executed by a processor 222 of the user device 106, enable the user device to perform its intended functions. Turning to the contents of the memory 220 in more detail, the memory 220 may include an operating system 224 that provides executable program instructions for the general administration and operation of the user device 106, and at least a mobile application 226 configured to cause the user device 106 to communicate with the mobile application server 108 in order to receive and utilize device keys. The memory 224 may include a number of device keys 228 associated with electronic devices. Additionally, the user device 106 may include a number of communication connections 229 which enable the user device 106 to communicate with other electronic devices. The communication connections 229 may include wireless or direct physical connections. Additionally, wireless connections may include any combination of short-range or long-range wireless protocols.

The mobile application 226 may be configured to, in conjunction with a processor 222, cause the user device 106 to issue commands to an electronic device 102 using a device key associated with that electronic device 102. In some embodiments, the mobile application 226 may include a graphical user interface (GUI) which enables a user to interact with the mobile application 226. The mobile application 226 may present to a user of the user device 106, via the GUI, one or more of a list of devices detected by the user device 106, a list of electronic devices associated with the user (e.g., electronic devices for which the user device 106 has received a device key), a current status of one or more electronic devices, and/or commands available for an electronic device. The mobile application 226 may be configured to receive user input via the GUI and issue commands to an electronic device based on the received user input. For example, the user may select an option to lock or unlock a particular electronic device via the GUI. In this example, the mobile application 226 may cause the user device 106 to transmit a corresponding lock or unlock command to the electronic device 106 that includes the device key for that electronic device. In some embodiments, the mobile application 226 may receive, in response to the transmitted command, a status update for the electronic device.

The electronic device 102 may be any suitable electronic device having installed within it an electronic circuit 230 as described herein. As described elsewhere, the electronic circuit 230 may be installed between a power source and other components of the electronic device 102 which are configured to perform some function, such that the electronic circuit 230 is able to restrict or disrupt power to those components in order to manage the ability of the electronic device 102 to perform the function. At least a portion of the electronic circuit 230 may include a secure element 232 which includes an encrypted memory. One or more device keys may be stored within the secure element 232 of the electronic circuit 230. In some embodiments, processors within the circuit (and potentially within the secure element 232) may be capable of decrypting device key information in order to process commands received from a user device 106. Additionally, the electronic device 102 may include a number of communication connections 234 which enable the electronic device 102 to communicate with other devices. The communication connections 234 may include wireless or direct physical connections. Additionally, wireless connections may include any combination of short-range or long-range wireless protocols.

The access device 104 may be any suitable device capable of managing access to an electronic device 102. More particularly, the access device 104 may manage access to device keys which can be used to issue commands to the electronic device 102. As described elsewhere, the access device 104 may be a point-of-sale (POS) terminal capable of conducting a transaction in relation to an electronic device. The access device 104 may include a number of communication connections 236 which enable the access device 104 to communicate with other devices. The communication connections 236 may include wireless or direct physical connections. Additionally, wireless connections may include any combination of short-range or long-range wireless protocols.

In some embodiments, the access device 104 may be configured to provide a device key directly to a user device upon completion of a transaction. This may first require that the access device communicate with the mobile application server 108 to retrieve the device key. To do this, the access device 104 may provide an identifier for the electronic device 102 to the mobile application server 108 with an indication that the electronic device 102 has been purchased. The access device 104 may then receive the device key in a response from the mobile application server 108. The access device 104 may then provide the device key to the user device 106. In some embodiments, this may involve encoding the device key into a machine-readable code and printing the machine-readable code onto a receipt. In some embodiments, this may involve establishing a wireless communication session between the access device 104 and the user device 106 and transmitting the device key to the user device 106 via that communication session.

In some embodiments, the access device 104 may be configured to cause the mobile application server 108 to provide a device key to a user device 106 upon completion of a transaction. To do this, the access device 104 may provide a user identifier to the mobile application server 108 along with an identifier for the electronic device 102. For example, the access device 104 may be configured to, in relation to a sale of an electronic device 102, collect a user identifier (e.g., an email address, loyalty identify, account identifier, phone number, credit card number, etc.) via user input. This may involve a user manually entering the identifier or bringing some identification device (e.g., a loyalty card or fob) into communicative contact (e.g., via radio frequency identifier (RDID) tag, reading magnetic media, or reading of a bar-code or QR code optically) with the access device 104. Once the access device has obtained an identifier for the user, the access device 104 may transmit that identifier, along with an identifier for the electronic device 102, to the mobile application server 108. Upon receiving the identifiers from the access device 104, the mobile application server 108 may identify an account associated with the user via the identifier, identify the device key associated with the electronic device 102, identify a user device 106 associated with the account, and transmit the device key to the user device 106.

In some embodiments, the communication network 201 may include any one or a combination of many different types of networks, such as cable networks, the Internet, wireless networks, cellular networks, and other private and/or public networks. In addition, the communication network 201 may comprise multiple different networks. For example, the user device 106 may utilize a 3G network to communicate with a wireless router, which may then route the communication over a public network (e.g., the Internet) to the mobile application server 108.

Figure 3:
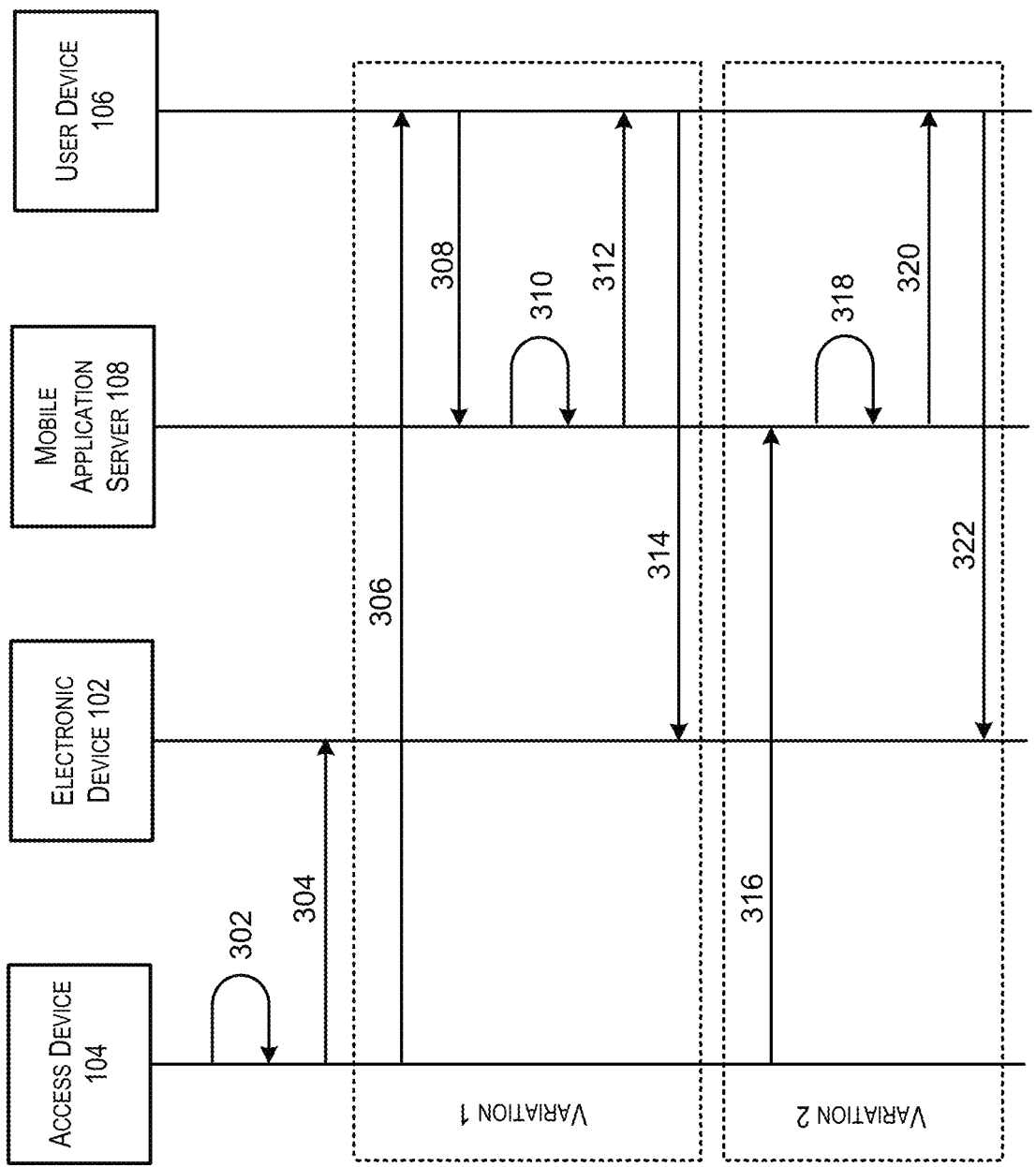
FIG. 3 depicts a process for transmitting and using a device key to issue commands to an electronic device in accordance with at least some embodiments.

FIG. 3 depicts a process for transmitting and using a device key to issue commands to an electronic device 102 in accordance with at least some embodiments. Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with embodiments of the disclosure, the process 300 of FIG. 3 may be performed by at least the access device 104, electronic device 102, mobile application server 108, and user device 106 shown in FIG. 2. The code may be stored on a computer-readable storage medium, for example, in the form of a computer program including a plurality of instructions executable by one or more processors. The computer-readable storage medium may be non-transitory. As depicted in FIG. 3, the process 300 may involve separate variations, of which two exemplary variations of the process 300 are described (variation 1 and variation 2). However, it should be noted that other variations of the process 300 being within the spirit of the disclosure would be apparent to one skilled in the art after reading this disclosure.

Process 300 may begin at 302, when an access device 104 receives an indication that an ownership interest in an electronic device 102 should be conveyed to a user. In some embodiments, this may result from the completion of a sale conducted at the access device 104 for that electronic device 102. In some embodiments, the access device 104 may obtain user information pertaining to the sale. For example, the access device 104 may collect a loyalty (or other account) identifier, a phone number, an email address, or some other suitable means of identifying a user.

In some embodiments, the access device 104 may be configured to transmit an unlock command to the electronic device 102 at 304. For example, upon completion of the sale of an electronic device 102, the access device 104 may be configured to establish communication with a circuit within the electronic device 102 and provide an unlock command along with a device key for the electronic device 102 in order to cause it to unlock the electronic device 102. In some cases, this may further involve the access device 104 retrieving a device key for the electronic device 102 from a mobile application server 108.

In embodiments of a first variation of the process 300 (Variation 1), the access device 104 may convey registration information to the user device 106 which enables the user to obtain the device key for the electronic device at 306. The registration information may be conveyed to the user device 106 via a number of different techniques. In some embodiments, the registration information may be encoded into a machine-readable code which is presented to the user device 106 by the access device 104. In some embodiments, the access device 104 may establish a communication session with the user device 106 and may convey the registration information over that communication session. In some embodiments, the registration information may include the device key. In some embodiments, the registration information may include an identifier for the electronic device 102 or an identifier for the transaction conducted at 302.

Upon receiving the registration information, the user device 106 may convey at least a portion of that registration information to the mobile application server 108 at 308. Additionally, the user device 106 may convey a user identifier to the mobile application server 108 at 308.

Upon receiving the registration information and user identifier at the mobile application server 108, the mobile application server 108 may identify an account associated with the user device 106 based on the received user identifier at 310. At this step, the mobile application server 108 may also identify one or more electronic devices 102 to be associated with that account based on the received registration information. The mobile application server 108 may further make a determination as to whether the one or more electronic devices 102 were legitimately obtained (e.g., legitimately sold) at this point. In some embodiments, once the one or more electronic devices have been identified and the electronic devices 102 are confirmed to have been sold or otherwise obtained legitimately, the mobile application server 108 may link the electronic devices 102 to the identified account.

Once the device keys for the electronic devices 102 have been identified, the mobile application server 108 may transmit those device keys to the user device 106 at 312. A mobile application installed upon, and executed from, the user device 106 may then store the device keys in local memory of the user device 106 for future use. In some embodiments, the device keys may be encrypted prior to being stored. Each device key may subsequently be used to issue commands to the corresponding electronic device 102 at 314.

In embodiments of a second variation of the process 300 (Variation 2), the access device 104 may convey a user identifier (collected at 302) to the mobile application server 108 at 316. As described above, the user identifier may be any identifier capable of being used to identify a particular user, communication channel, and/or account. The user identifier may be provided to the mobile application server 108 along with an indication of an electronic device 102 and/or a completed transaction.

Upon receiving the user identifier, the mobile application server 108 may identify an account associated with the user identifier at 318. The mobile application server 108 may identify one or more electronic devices 102 to be associated with the identified account based on the indication of the electronic device 102 or completed transaction. The mobile application server 108 may also identify device keys corresponding to each of the identified electronic devices 102. Additionally, the mobile application server 108 may identify contact information for a user device 106 associated with the identified account. For example, the mobile application server 108 may retrieve a phone number on record for the account.

Once the device keys for the electronic devices 102 have been identified, the mobile application server 108 may transmit those device keys to the user device 106 at 320. In some embodiments, the mobile application server 108 may transmit the device keys via contact information identified at 318. A mobile application installed upon, and executed from, the user device 106 may then store the device keys in local memory of the user device 106 for future use. In some embodiments, the device keys may be encrypted prior to being stored. Each device key may subsequently be used to issue commands to the corresponding electronic device 102 at 322.

Figure 4:
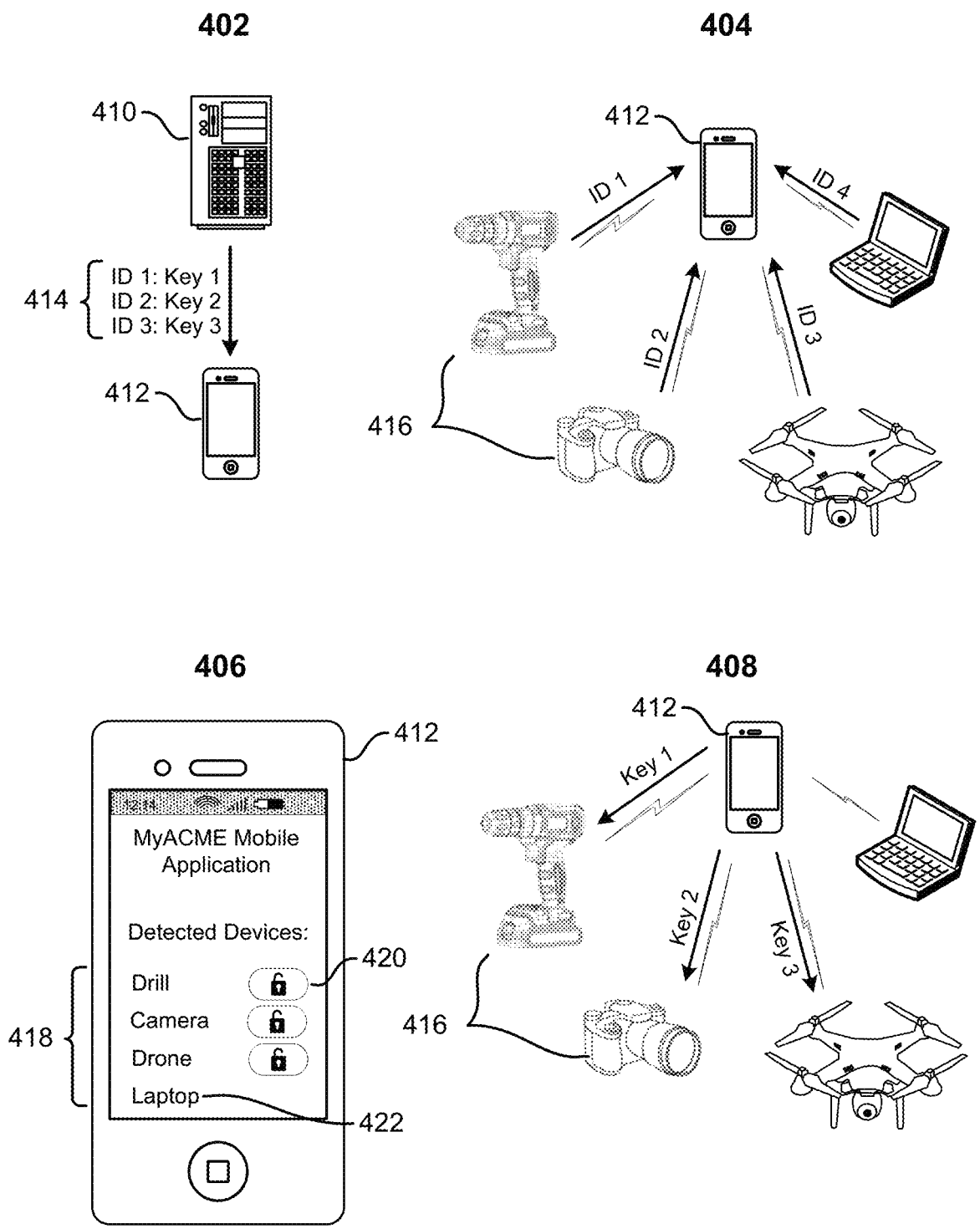
FIG. 4 depicts an illustrative example of an interaction that may occur using embodiments of the system described herein.

FIG. 4 depicts an illustrative example of an interaction that may occur using embodiments of the system described herein. The interaction of FIG. 4 is depicted during four different phases of the interaction, which are labeled 402, 404, 406, and 408. As depicted at 402, a mobile application server 410 may detect an update to an ownership or authorization status regarding an electronic device (e.g., as a result of a sale or rental) or other suitable indication that a device key is needed. In response, the mobile application server 410 may identify a device key 414 for the electronic device and transmit that device key 414 to a user device 412 determined to be authorized to access the electronic device. In some embodiments, the mobile application server 410 may transmit a number of device keys 414 to the user device 412. Each of these keys may be mapped to an identifier for an electronic device. It should be noted that the device keys 414 may be transmitted one at a time (e.g., as separate communications) or as a set of device keys 414. Once received by the user device 412, the device keys (along with their corresponding electronic device identifiers) may be stored in memory of the user device 412.

As depicted at 404, a user device 412 may connect with a number of electronic devices 416. In some cases, a short-range wireless communication means may be activated on the user device 412. Upon activation, the user device 412 may detect a number of electronic devices 416 in the vicinity of the user device 412 (e.g., within communication range of the short-range communication means). Each electronic device 416 may provide a corresponding identifier (ID) by which that electronic device can be identified. In some embodiments, a format or indicator within the identifier may be used to determine a type or category of the electronic device 416. It should be noted that in embodiments of the electronic device in which a circuit (e.g., circuit 230 of FIG. 2) is independently powered, the electronic devices 416 may be detected even if the electronic devices 416 themselves are not powered.

Upon receiving identifiers from the electronic devices within the vicinity of the user device 412, the user device 412 may determine for which electronic devices in its vicinity it has stored a corresponding device key. As depicted at 406, the user device 412 may compile a list 418 of detected devices 416 which may be presented to a user. In some embodiments, the list 418 of detected devices 416 may be accompanied by an indication 420 of one or more commands available to the user of the user device 412. In some embodiments, the list 418 of detected devices 416 may include all electronic devices detected in the vicinity of the user device 412, which includes electronic devices 422 for which no device key is available. In some embodiments, the list 418 of detected devices 416 may include only electronic devices for which a device key is currently stored in memory of the user device.

As depicted at 408, a user of the user device 412 may issue commands to one or more of the electronic devices 416. To do this, the user device 412 may be configured to transmit the command along with a device key corresponding to the electronic device 416. It should be noted that in embodiments of the electronic device in which a circuit (e.g., circuit 230 of FIG. 2) is independently powered, commands may be transmitted to the electronic devices 416 even if the electronic devices 416 themselves are not powered.

Figure 5:
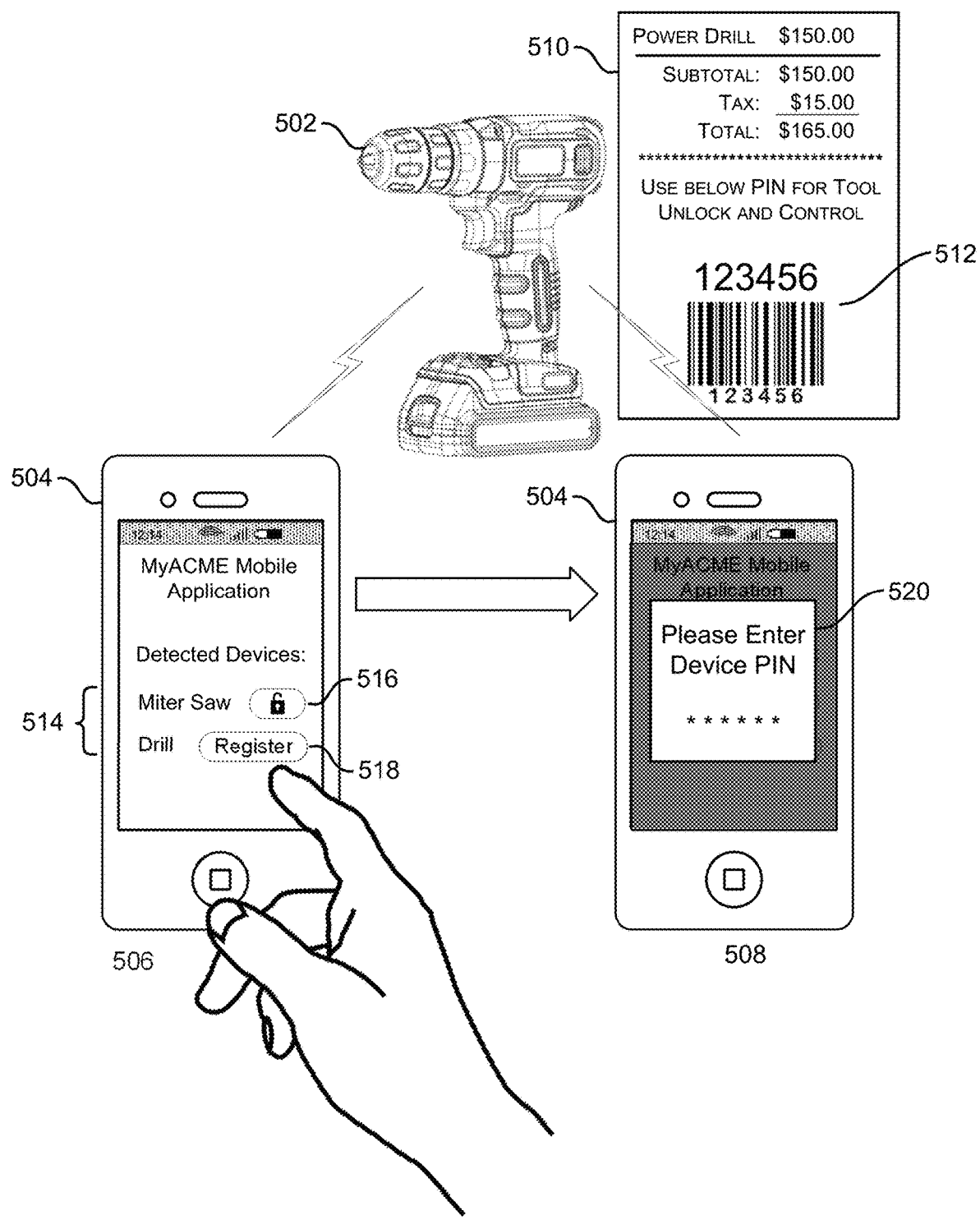
FIG. 5 depicts a first illustrative example of a user interaction enabled via a mobile application graphical user interface executed on a user device in accordance with at least some embodiments.

FIG. 5 depicts a first illustrative example of a user interaction enabled via a mobile application GUI executed on a user device in accordance with at least some embodiments. The illustrated user interaction results in enabling commands to be issued to the electronic device 502 via a user device 504. In FIG. 5, the interaction is illustrated via a mobile application GUI (executed from a user device) depicted during two different phases of the interaction, which are labeled 506 and 508. In some embodiments, the mobile application may be associated with an account maintained by a mobile application server (e.g., mobile application server 108 described with respect to FIG. 1). In order to use the mobile application, a user may be required to log into the account, which may involve authenticating the user via user-provided login credentials or some other authentication means (e.g., biometrics).

In accordance with at least some embodiments, a receipt 510 may be generated upon completion of a sale of an electronic device 502. A receipt 510 as described herein may be physical (e.g., printed) or virtual (e.g., digital) in nature and may include registration information 512 that may be used to authenticate an owner of the electronic device 502. In some embodiments, the registration information 512 may be formatted in a manner suitable to be read by a human user. In some embodiments, the registration information 512 may be formatted in a manner which can be read by a user device 504. For example, the registration information 512 may be encoded into a machine-readable code. In some embodiments, the registration information 512 may be provided in both formats.

As depicted at 506, the GUI may display a number of electronic devices detected within the vicinity of the user device 504. In some cases, a short-range wireless communication means may be activated on the user device 504. Upon activation, the user device 504 may detect a number of electronic devices 502 in the vicinity of the user device 504 (e.g., within communication range of the short-range communication means). Each electronic device 502 may provide a corresponding identifier (ID) by which that electronic device can be identified. Upon receiving identifiers from the electronic devices within the vicinity of the user device 504, the user device 504 may determine for which electronic devices in its vicinity it has stored a corresponding device key. As depicted at 506, the user device 504 may compile a list 514 of detected devices which may be presented to a user. In some embodiments, the list 514 of detected devices may be accompanied by an indication 516 of one or more commands available to the user of the user device 504 for electronic devices which do correspond to a device key stored in memory.

In some embodiments, upon determining that the user device 504 does not currently have a device key in memory for a detected electronic device 502, the mobile application may enable a user of the user device 504 to attempt to register the electronic device. In some cases, user device 504 may transmit a query to a mobile application server that includes an identifier for the electronic device 502 to determine that the electronic device 502 is not already registered as well as that the electronic device 502 has been legitimately sold. In some embodiments, registration information 512 may be generated upon a legitimate sale of an electronic device 502, such that it is only available for electronic devices which have been legitimately sold. Additionally, a mobile application server may maintain a record of sales of electronic devices which may be consulted to determine whether an electronic device 502 has been legitimately sold.

Upon receiving instructions from a user of the user device 504 to register an electronic device 502, the GUI may provide a prompt 520 to provide details from the registration information 512 in order to authenticate that the user is the legitimate purchaser of the electronic device 502. In some embodiments, the details may be manually input by a user (e.g., via a keypad). In some embodiments, the details may be input using a barcode scanner or other input device in communication with the user device 504. Upon receiving those details, the user device 504 may convey the details to a mobile application server, which may compare the entered details to those on record. Provided that the details match, the mobile application server may respond by retrieving the device key associated with the electronic device 502 and transmitting that device key to the user device 504. The list of detected devices 514 may then be updated to indicate that a command is available to be provided to the electronic device 502. The user device 504 may then be used to issue commands to the electronic device 502 using the received device key. It should be noted that in the illustrative interaction described with respect to FIG. 5, the electronic device need not be linked to an account. Additionally, in embodiments in which prior registration is not checked, any person in possession of the receipt may gain access to the device key. This enables the original owner of the electronic device 502 to sell the electronic device to a new owner and enable that new owner to obtain a device key on his or her own user device.

Figure 6:
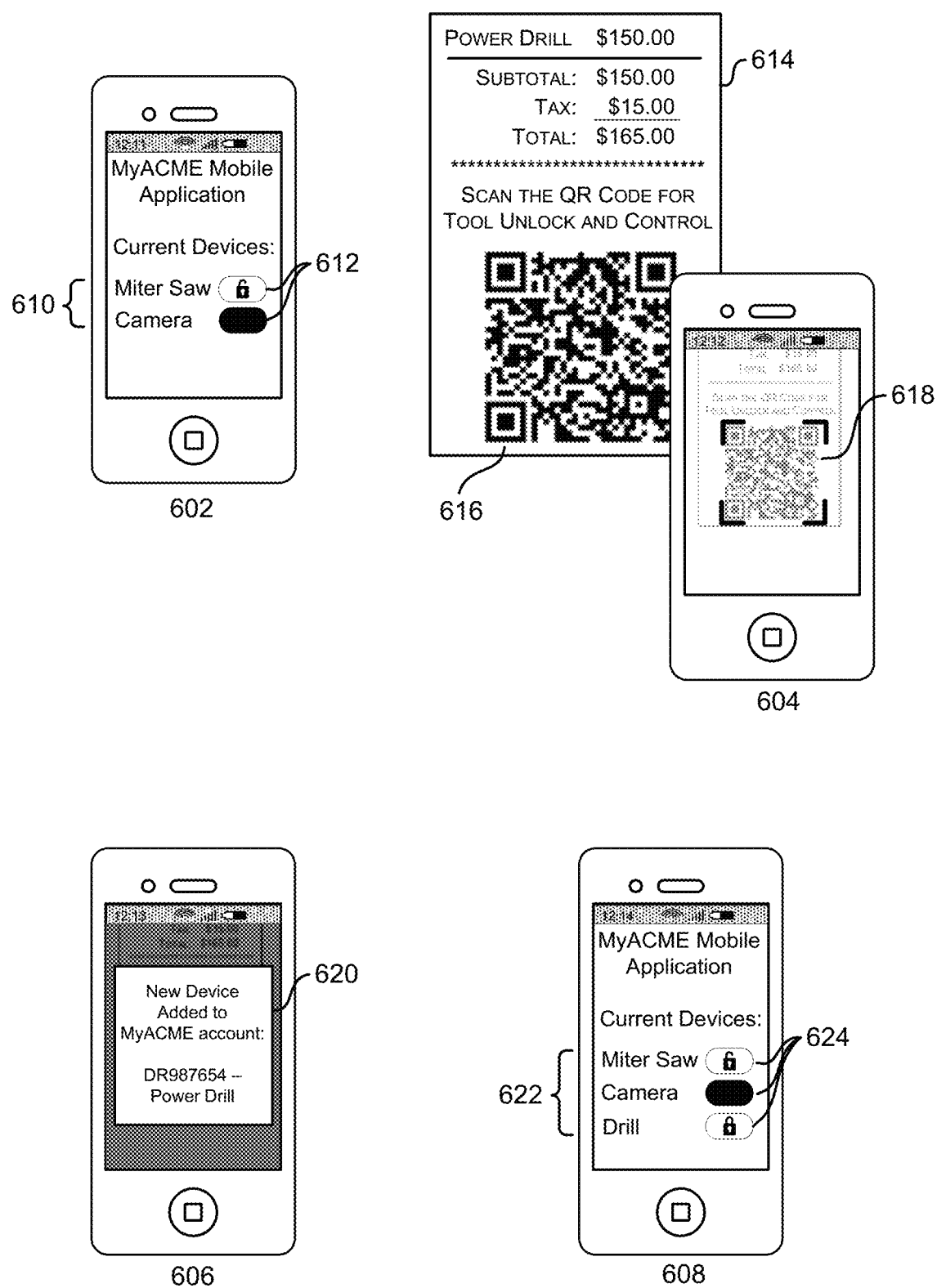
FIG. 6 depicts a second illustrative example of a user interaction enabled via a mobile application graphical user interface executed on a user device in accordance with at least some embodiments.

FIG. 6 depicts a second illustrative example of a user interaction enabled via a mobile application GUI executed on a user device in accordance with at least some embodiments. The illustrated user interaction results in linking an electronic device to an account as well as enabling commands to be issued to the electronic device via a user device. In FIG. 6, the interaction is illustrated via a mobile application GUI (executed from a user device) depicted during four different phases of the interaction, which are labeled 602, 604, 606, and 608. In some embodiments, the mobile application may be associated with an account maintained by a mobile application server (e.g., mobile application server 108 described with respect to FIG. 1). In order to use the mobile application, a user may be required to log into the account, which may involve authenticating the user via user-provided login credentials or some other authentication means (e.g., biometrics).

As depicted at 602, the mobile application GUI may display a list 610 of electronic devices currently associated with the account linked to the mobile application. In some embodiments, the mobile application may store the list 610 of electronic devices (and corresponding device keys) locally in the memory of the user device on which it is executed. In some embodiments, the list may be generated upon the mobile application causing the user device to communicate with a mobile application server in order to request the current list 610 of electronic devices. In some embodiments, the list 610 of electronic devices may include only those electronic devices detected as being within wireless communication range of the user device. In other embodiments, the list 610 of electronic devices may include all electronic devices currently linked with the account associated with the mobile application.

Along with the list 610 of electronic devices, the mobile application GUI may display additional information 612 for each electronic device in the list 610. For example, the mobile application GUI may display additional information 612 which includes a name (or nickname) of the electronic device, a status of the electronic device, available commands for the electronic device, an indication as to whether the electronic device is in range, etc. In some embodiments, the additional information 612 may be dynamically updated based on information about each electronic device. For example, if a current status of a tool is "locked" then "unlock" may be displayed as an available command, whereas "lock" may not be displayed as an available command. By way of a second example, a command may be greyed out on the GUI or made unavailable if the electronic device is not currently within wireless range of the user device. In some embodiments, the types of commands available for a particular electronic device may vary based on the type or category of that electronic device.

As depicted at 604, an additional electronic device may be linked to an account associated with a mobile application using a receipt 614 generated from a sale of the electronic device. In some embodiments, the receipt may include a machine-readable code 616 which has registration details encoded within it. In order to link the electronic device to an account associated with the mobile application, the user device may be used to scan the machine-readable code 616. For example, an image 618 of the machine-readable code 616 may be captured using a camera device installed on the user device and accessed by the mobile application. The mobile application may then decode the registration information encoded within the machine-readable code 616. In some embodiments, the mobile application may be caused to automatically (i.e., without human interaction) take an action regarding the registration information.

The registration information encoded into the machine-readable code 616 may include any suitable information that may be used to link one or more electronic devices to an account. In some embodiments, the registration information may include device identifiers, such as a serial numbers, for each of the electronic devices purchased in a transaction. In some embodiments, the registration information may include a transaction identifier that may be used to identify a particular completed transaction. In some embodiments, the registration information may include a link or location indicator which causes the mobile application to access a location in which various electronic device details are stored. In some embodiments, the registration information may include a code or PIN associated with the completed transaction which may be used to verify that the user of the user device is in physical possession of the receipt 614.

In some embodiments, the registration information may include one or more device keys to be associated with the electronic devices. In other embodiments, the registration information may not include those device keys, such that the device keys must be retrieved from a mobile application server. For example, upon completion of a transaction at a resource provider, that resource provider may independently provide a record of the transaction to a mobile application server. The mobile application server may then update a status associated with each electronic device involved in the transaction to indicate that the electronic device has been legitimately sold. Continuing with the above example, a mobile application that has obtained registration information associated with an electronic device (or electronic devices) from a machine-readable code 616 may communicate that registration information to the mobile application server. The mobile application server may then determine that the electronic devices identified in relation to the registration information have been legitimately sold and have not already been registered. Upon making this determination, the mobile application server may then link the electronic devices to the account associated with the mobile application, identify the corresponding device keys for each of the electronic devices, and transmit each of the corresponding device keys to the mobile application.

As depicted at 606, once an electronic device has been successfully linked to an account associated with the mobile application, a notification 620 may be displayed indicating that the electronic device has been successfully linked to the account. In some embodiments, the mobile application may receive a device key from the mobile application server upon the electronic device being successfully linked to the account. In some embodiments, the mobile application may receive a device key from the registration information encoded into the machine-readable code 616, which may then be stored in association with the electronic device by the mobile application.

As depicted at 608, the mobile application GUI may display an updated list 622 of electronic devices currently linked to the account associated with the mobile application once the electronic device has been linked to the account. The mobile application GUI may also display updated additional information 624 for each of the electronic devices in the list 622. Once the electronic device has been linked to the account, the mobile application GUI may be used to issue commands to the electronic device using the received device key.

Figure 7:
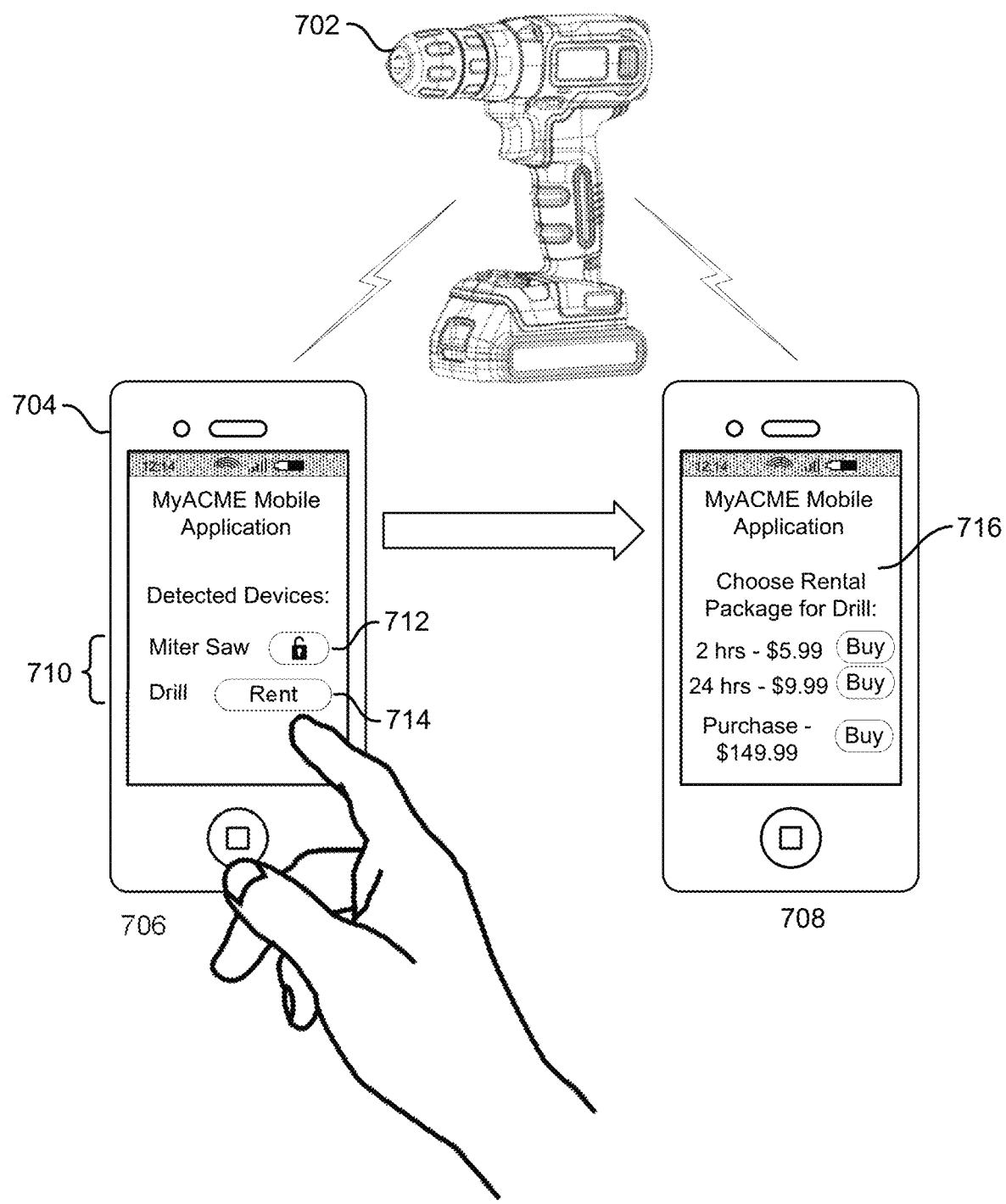
FIG. 7 depicts a third illustrative example of a user interaction enabled via a mobile application graphical user interface executed on a user device in accordance with at least some embodiments.

FIG. 7 depicts a third illustrative example of a user interaction enabled via a mobile application GUI executed on a user device in accordance with at least some embodiments. The illustrated user interaction results in enabling commands to be issued to the electronic device 702 via a user device 704 for a predetermined amount of time (e.g., as a rental). In FIG. 7, the interaction is illustrated via a mobile application GUI (executed from a user device) depicted during two different phases of the interaction, which are labeled 706 and 708.

As depicted at 706, the GUI may display a number of electronic devices detected within the vicinity of the user device 704. As depicted at 706, the user device 704 may compile a list 710 of detected devices which may be presented to a user. In some embodiments, the list 710 of detected devices may be accompanied by an indication 712 of one or more commands available to the user of the user device 704 for electronic devices which correspond to a device key stored in memory of the user device 704.

In some embodiments, upon determining that the user device 704 does not currently have a device key in memory for a detected electronic device 702, the mobile application may enable a user of the user device 704 to attempt to rent the electronic device (e.g., via button). In some cases, user device 704 may transmit a query to a mobile application server that includes an identifier for the electronic device 702 and the mobile application server may respond that the electronic device 702 is available for rent. In some embodiments, the mobile application server may also provide a link to a location (e.g., a uniform resource locator (URL)) which will enable the user of the user device to initiate a transaction to rent the electronic device. For example, upon selection of a button 714 to rent the electronic device 702, the mobile application GUI may load a webpage 716 hosted by the mobile application server. Upon completion of a transaction by the user, the mobile application server may transmit a device key associated with the electronic device 702 to the user device 704, though the device key may be encrypted as described below.

Each electronic device 702 may include a secure memory element having associated with it a cryptographic key. In some embodiments, the cryptographic key may be part of a cryptographic key pair that can be used to securely communicate with the secure memory element. In these embodiments, the mobile application server, upon completion of a transaction for rental of an electronic device 702 as described above, may generate a packet of data that includes at least an expiration date/time as well as the device key. The mobile application server may then encrypt that packet so that it may only be decrypted using the cryptographic key of the secure element. One skilled in the art would recognize that this would prevent the user device from capturing the device key despite having possession of the encrypted packet. The user device 704 is then able to issue a command to the electronic device 702 by providing the encrypted packet that includes the device key. In these embodiments, the commands would continue to be executed until the expiration date/time is reached, after which the electronic device 702 may no longer accept the encrypted packet. In some embodiments, the electronic device 702 may revert to a "locked" state upon reaching the indicated expiration date/time.

Figure 8:
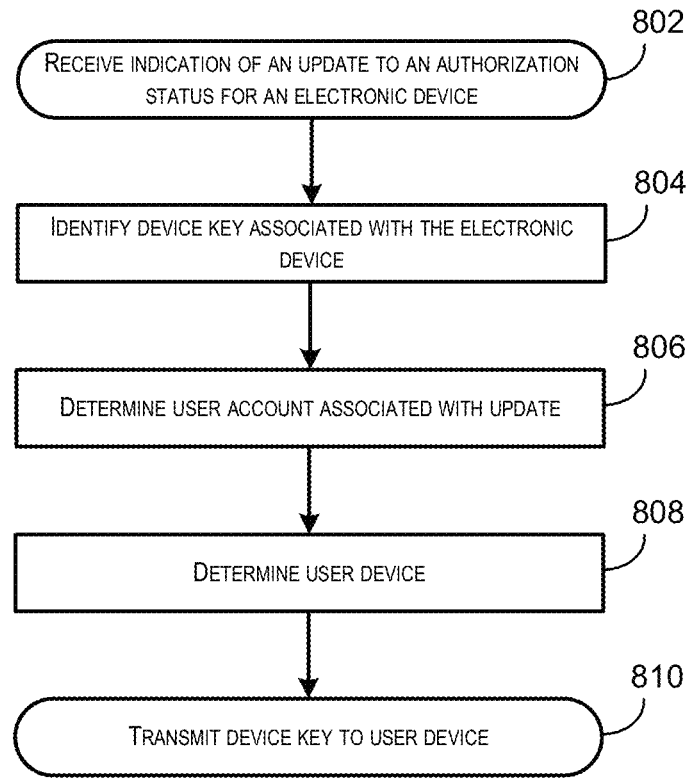
FIG. 8 depicts a flow diagram illustrating a process for updating an authorization status of an electronic device and providing a device key to a user device in accordance with at least some embodiments.

FIG. 8 depicts a flow diagram illustrating a process for updating an authorization status of an electronic device and providing a device key to a user device in accordance with at least some embodiments. In accordance with at least one embodiment, the process 800 of FIG. 8 may be performed by at least the mobile application server 108 shown in FIG. 2.

Process 800 may begin at 802 upon receiving an indication of an update to an authorization status of an electronic device. The indication may include at least an identifier for the electronic device. An authorization status for an electronic device may be any indication of which users are authorized to issue commands to the electronic device. In some embodiments, an update to the authorization status of the electronic device may be a sale of the electronic device. In some embodiments, an update to the authorization status of the electronic device may be caused by a rental or lending of the electronic device.

At 804, the process 800 may involve identifying a device key associated with the electronic device. The device key may be associated with only a single electronic device. In some embodiments, the device key may be identified by querying a database of mappings between electronic device identifiers and device keys stored in memory of the mobile application server (e.g., device key data 212 of FIG. 2).

At 806, the process 800 may involve determining an account associated with the update to the authorization status of the electronic device. The account may be determined based upon a received user identifier. For example, upon a sale of the electronic device, an access device (e.g., a point-of-sale terminal) may provide a user identifier to the mobile application server which may be used to identify the account. Such a user identifier may be at least one of a loyalty account number, credit card number, phone number, email address, or user name. In some embodiments, the process 800 may further involve associating the electronic device with the account.

At 808, the process 800 may involve determining a user device associated with the update to the authorization status of the electronic device. In some embodiments, the user device is determined by virtue of being associated with the determined account. In some embodiments, the process 800 may further involve receiving a request for the device key from the user device, and the user device may be determined by virtue of having provided the request. In these embodiments, the request may include a transaction identifier capable of being used to identify the update to the authorization status of the electronic device.

At 810, the process 800 may involve transmitting the device key to the user device. Once received, the device key is usable by the user device to issue commands to the electronic device. For example, the user device may issue at least a command to lock the electronic device or a command to unlock the electronic device. In some embodiments, the device key is transmitted to the user device via a push notification. In some embodiments, the user device is operated by an agent of a resource provider providing access to the electronic device. In some embodiments, the user device is operated by a purchaser of the electronic device.

Embodiments of the disclosure provide for a number of technical advantages over conventional systems. For example, embodiments of the invention can enable owners of an electronic device to lock and unlock that electronic device in a manner which deprives any unauthorized user of the benefit of the electronic device. When such an electronic device is locked, it remains locked until it is unlocked using the secret device key. The result is that devices which are stolen while locked will be virtually worthless to any would-be thief. By reducing the value of the electronic device to a potential thief, the disclosed system discourages theft of electronic devices. In the case that thieves are aware that a particular resource provider locks all electronic devices until a legitimate purchase is made, those thieves are likely to steal from other resource providers.

Additionally, the system enables new functionality to be implemented in existing electronic devices. Workers can lock or unlock their tools upon entering/exiting a job site, which can lead to fewer accidents caused by unintentional tool activations. Owners of a tool can rent out or lend out their tools knowing that the tool will lock upon expiration of the rental period, ensuring that a failure to return the tool will not benefit the lendee. One skilled in the art would recognize a number of additional benefits gained from the system described herein.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
    receiving a device key and an identifier for an electronic device, a copy of the device key stored in a secure memory of the electronic device;
    receiving an indication that a sale of the electronic device has occurred, the indication including at least the identifier for the electronic device;
    identifying the device key associated with the electronic device, the device key being associated with only the electronic device;
    determining a user device associated with the sale of the electronic device; and
    transmitting the device key to the user device, wherein the device key is transmitted by the user device along with commands to the electronic device, wherein the electronic device includes circuitry configured to allow compliance with the commands only if the device key received by the electronic device from the user device matches the copy of the device key stored in the secure memory of the electronic device.

2. The method of claim 1, wherein the commands comprise at least a command to lock the electronic device or a command to unlock the electronic device.

3. The method of claim 1, wherein determining a user device associated with the sale of the electronic device comprises determining an account associated with the sale of the electronic device and determining a user device associated with the account.

4. The method of claim 3, further comprising associating the electronic device with the account.

5. The method of claim 3, wherein the account associated with the sale of the electronic device is determined based upon a received user identifier.

6. The method of claim 5, wherein the received user identifier comprises at least one of a loyalty account number, credit card number, phone number, email address, or user name.

7. The method of claim 6, wherein the user identifier is received from an access device within the indication of the sale of the electronic device.

8. A mobile application server comprising:
    a processor; and
    a non-transitory memory including instructions that, when executed with the processor, cause the mobile application server to, at least:
        receive a device key and an identifier for an electronic device, a copy of the device key stored in a secure memory of the electronic device;
        receive an indication that a sale of the electronic device has occurred;
        identify the device key associated with the electronic device;
        determine a user device associated with the sale of the electronic device; and
        transmit the device key to the user device, wherein the device key is transmitted by the user device along with commands to the electronic device, wherein the electronic device includes circuitry configured to allow compliance with the commands only if the device key received by the electronic device from the user device matches the copy of the device key stored in the secure memory of the electronic device.

9. The mobile application server of claim 8, wherein the instructions included in the memory, when executed with the processor, cause the mobile application server to transmit the device key to the user device via a push notification.

10. The mobile application server of claim 8, wherein the instructions included in the memory, when executed with the processor, cause the mobile application server to determine that the user device is associated with the electronic device if the mobile application server receives a request for the device key from the user device.

11. The mobile application server of claim 10, wherein the request includes a transaction identifier capable of being used to identify the sale of the electronic device.

12. The mobile application server of claim 8, wherein the instructions included in the memory, when executed with the processor, cause the mobile application server to permit user devices operated by an agent of a resource provider providing access to the electronic device to be utilized as the user device associated with the update to the authorization status of the electronic device.

13. The mobile application server of claim 8, wherein the instructions included in the memory, when executed with the processor, cause the mobile application server to permit user devices operated by a purchaser of the electronic device to be utilized as the user device associated with the update to the authorization status of the electronic device.

14. A user device comprising:
   a processor; and
   a non-transitory memory including instructions that, when executed with the processor, cause the user device to, at least:
      receive an indication of an electronic device identifier for an electronic device associated with an owner of the user device;
      receive a device key associated with the electronic device identifier and store the device key in association with the electronic device identifier, wherein a copy of the device key is also stored in a secure memory of the electronic device associated with the electronic device identifier; and
      establish a communication session with the electronic device associated with the electronic device identifier; and
   issue a command to the electronic device via the communication session, the command including at least the device key, wherein the electronic device includes circuitry configured to allow compliance with the command only if the device key received by the electronic device from the user device matches the copy of the device key stored in the secure memory of the electronic device.

15. The user device of claim 14, wherein the instructions included in the memory, when executed with the processor, cause the user device to transmit a request to a mobile application server for the device key associated with the electronic device identifier.

16. The user device of claim 14, wherein the instructions included in the memory, when executed with the processor, cause the user device to receive at least one of the electronic device identifier or the device key associated with the electronic device identifier by decoding information encoded within a machine-readable code.

17. The user device of claim 16, wherein the machine-readable code is printed on a receipt for the electronic device and the instructions included in the memory, when executed with the processor, cause the user device to detect the machine-readable code.

18. The user device of claim 14, further comprising circuitry for executing a short-range wireless communication protocol.

19. The user device of claim 18, wherein the instructions included in the memory, when executed with the processor, cause the user device to establish the communication session with the electronic device automatically upon the electronic device entering within communication range via the short-range wireless communication protocol.

* * * * *